Figure 1:
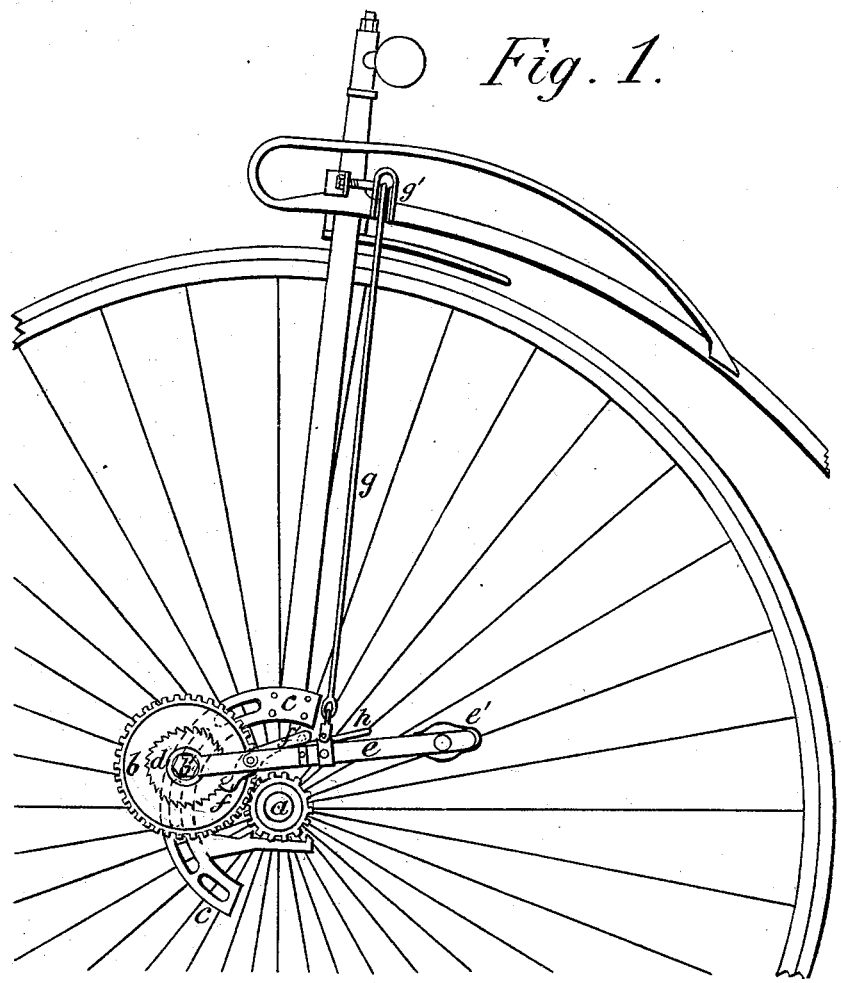

(No Model.)

J. DUTTON.
DRIVING MECHANISM FOR VELOCIPEDES.

No. 247,809. Patented Oct. 4, 1881.

Witnesses:
Edward G. Siggers
John A. Biedersheim

Inventor:
Joseph Dutton
by W. H. Babcock
Attorney.

UNITED STATES PATENT OFFICE.

JOSEPH DUTTON, OF BERMONDSEY, COUNTY OF SURREY, ENGLAND.

DRIVING MECHANISM FOR VELOCIPEDES.

SPECIFICATION forming part of Letters Patent No 247,809, dated October 4, 1881.

Application filed April 30, 1881. (No model.) Patented in Great Britain May 21, 1880.

*To all whom it may concern:*

Be it known that I, JOSEPH DUTTON, of Bermondsey, in the county of Surrey, England, a subject of the Queen of Great Britain, have invented new and useful Improvements in Driving Mechanism for Bicycles, Tricycles, and like vehicles, which improved driving mechanism is also applicable to other purposes, of which the following is a specification.

This invention has for its object to supersede and dispense with all necessity for a crank-motor in any vehicle or machine to which it may be applied, and such improved driving mechanism is applicable generally to any machine or vehicle actuated by crank-motion, thus both simplifying the construction thereof and imparting a high rate of velocity thereto with a minimum amount of exertion on the part of the operator.

In the following description and drawings I have illustrated the application of my improved driving mechanism to bicycles. Such improved driving mechanism consists of a spur-wheel mounted on the axis of the main wheel or wheels of the vehicle, and a second spur-wheel in gear with the first. The axis of the second spur-wheel is carried by an arm, so contrived that this axis can be clamped in different positions, either higher or lower, as may be required, but always with the two spur-wheels in gear. In the case of a bicycle this arm is attached to the fork carrying the bearings for the axis of the main wheel, and such arm is formed as a segment of a circle, of which, when the arm is in place, the axis of the main wheel is the center. Fast with the second spur-wheel is a ratchet-wheel, and a pawl engages with the ratchet-teeth. The pawl is carried by a lever mounted on the axis of the second spur-wheel, so as to be able to turn freely thereon. This lever is formed at its rear end as a treadle, whereon the foot of the rider is placed. Similar gear to the above is provided on each side of the main wheel, thus providing a treadle for each foot. The treadles are connected by a cord passing up over a pulley, so that as one treadle is depressed the other is elevated, and as either treadle is depressed the pawl upon the treadle-lever engages with the teeth of its ratchet, thus during the downstroke imparting motion by means of the treadle to the main wheel and to the vehicle itself. As the treadles are operated alternately the power is applied continuously, or nearly so, or at pleasure. Both feet and both treadle-levers may be kept for a time at rest, allowing the vehicle to run forward by the momentum it has already acquired.

By suitably adjusting the axis carrying the treadle-levers upon the segmental arms, the treadles may be brought to that position which is most convenient to the rider, so that the vehicle can with great facility be adjusted for different riders of different statures.

The pawls may also, if desired, be so arranged as to be drawn back out of gear by a simple forward movement of the foot without lifting it from the treadle-lever.

Another advantage of my improved driving mechanism in its application to bicycles is that it obviates all risk of the rider being pitched forward in the event of the wheel coming in contact with a stone or other obstruction, as owing to the treadle-motion being worked from the back instead of from the front, as in the ordinary arrangement, the shock experienced on any such collision serves to jerk the rider backward instead of forward at the same time that his gripe on the handles enables him to readily and securely maintain his balance.

In order that my said invention may be more fully understood and readily carried into effect, I will now proceed to describe the accompanying drawings.

Figure 1 is a partial view in side elevation of the front wheel of a bicycle fitted with my improved driving mechanism.

$a$ is the toothed wheel or pinion upon the axis of the main wheel, and $b$ is a spur-wheel in gear with the wheel $a$.

$c$ is an arm carrying the axis $b'$ of the wheel $b$. It is clipped onto the forked frame of the bicycle. The arm $c$ is an arc of a circle, and is concentric with the pinion $a$. The axis $b'$ can be set in any position upon the arm $c$, which may be most convenient to the rider, and in any position the wheels $a$ and $b$ will gear truly together.

$d$ is a ratchet-wheel fast with the wheel $b$, and $e$ is a lever mounted upon the same axis $b'$, on which it is able to turn freely.

Figure 2:
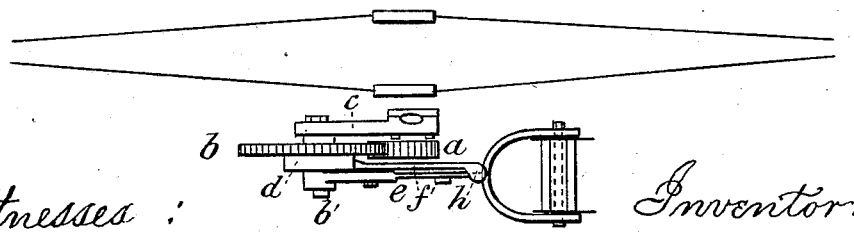

$f$ is a pawl mounted on a stud upon the side of the lever $e$. It is provided with a tail, $f'$, extending to the rear of the stud. An india-rubber or other spring connects the tail $f'$ with the lever $e$, and causes the pawl to engage with the ratchet-teeth. The rear end of the lever $e$ carries a treadle at $e'$. The driving-gear upon the two sides of the main wheel is similar, and the lever $e$ on the one side is connected with the corresponding lever on the other side by a cord, $g$, which is led over the pulleys $g'$ $g'$ carried upon the main frame. The rider can at pleasure lift the pawls $f$ out of gear with the ratchets $d$. To admit of this, a little movable arm, $h$, is connected by a stud or pivot with the lever $e$, and the rider, when he desires to put the pawl out of gear, moves his foot forward and presses with the toe upon the hinder end of the arm $h$. The arm then acts against the pawl and removes it from contact with the teeth. A plan of my improved driving mechanism is shown at Fig. 2.

Such improved driving mechanism may also be adapted to sewing and other machines which have hitherto been actuated by a crank-motion.

Having thus described the nature of my said invention and the manner of performing the same, I claim—

1. The treadle-lever $e$, pawl $f$, ratchet-wheel $d$, and gear-wheels $a$ $b$, in combination with slotted arm $c$, which allows the adjustment of the pivot of said lever, for the purpose set forth.

2. In combination with treadle-lever $e$, pawl $f$, ratchet-wheel $d$, and gear-wheels $a$ $b$, the arm $h$, engaging with the said pawl to lift it out of engagement, substantially as set forth.

3. The strap $g$, passing from lever to lever over the wheel, in combination with the treadle-levers $e$, pawls $f$, ratchet-wheels $d$, gear-wheels $a$ and $b$, and arm $h$, substantially as set forth.

JOSEPH DUTTON.

Witnesses:
  SHIRLEY BOWDEN,
    *Patent Solicitor, London.*
  W. R. LOWMAN.